(12) United States Patent
Chang et al.

(10) Patent No.: US 9,083,033 B2
(45) Date of Patent: *Jul. 14, 2015

(54) METHOD FOR PREPARING ANODE ACTIVE MATERIAL

(71) Applicant: LG CHEM, LTD., Seoul (KR)

(72) Inventors: Sung-Kyun Chang, Daejeon (KR); WonSeok Chang, Daejeon (KR); JungMin Han, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,566

(22) Filed: Jun. 21, 2013

(65) Prior Publication Data

US 2013/0288131 A1 Oct. 31, 2013

Related U.S. Application Data

(63) Continuation of application No. PCT/KR2012/000101, filed on Jan. 5, 2012.

(30) Foreign Application Priority Data

Jan. 11, 2011 (KR) .................. 10-2011-0002565

(51) Int. Cl.
  *H01M 4/133* (2010.01)
  *H01M 4/36* (2006.01)
  *H01M 4/587* (2010.01)
  *H01M 4/04* (2006.01)
  *H01M 10/0525* (2010.01)

(52) U.S. Cl.
  CPC ............ *H01M 4/133* (2013.01); *H01M 4/0471* (2013.01); *H01M 4/366* (2013.01); *H01M 4/587* (2013.01); *H01M 10/0525* (2013.01); *Y02E 60/122* (2013.01)

(58) Field of Classification Search
  CPC ....... H01M 4/133; H01M 4/134; H01M 4/04; H01M 4/36; H01M 4/386; H01M 4/485; H01M 4/483

USPC ............. 429/211, 212, 218.1, 231.4
See application file for complete search history.

(56) References Cited

U.S. PATENT DOCUMENTS

| | | | |
|---|---|---|---|
| 2005/0287440 A1 | 12/2005 | Chang et al. | |
| 2006/0172201 A1* | 8/2006 | Yasukawa et al. | 429/329 |
| 2009/0117467 A1* | 5/2009 | Zhamu et al. | 429/231.8 |
| 2010/0136432 A1 | 6/2010 | Kim | |
| 2010/0255352 A1* | 10/2010 | Inagaki et al. | 429/7 |
| 2013/0244106 A1* | 9/2013 | Chang et al. | 429/211 |
| 2013/0288106 A1* | 10/2013 | Chang et al. | 429/156 |
| 2013/0295433 A1* | 11/2013 | Chang et al. | 429/156 |

FOREIGN PATENT DOCUMENTS

| | | |
|---|---|---|
| EP | 1575104 A1 * | 9/2005 |
| KR | 10-2000-0056985 A | 9/2000 |
| KR | 2001-0054903 A | 7/2001 |
| KR | 10-2004-0082803 A | 9/2004 |
| KR | 10-2006-0047424 A | 5/2006 |
| KR | 10-2010-0062083 A | 6/2010 |

OTHER PUBLICATIONS

PCT/ISA/210—International Search Report mailed Sep. 28, 2012, issued in PCT/KR2012/000101.

* cited by examiner

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

Disclosed is a method including (a) mixing a precursor of a material for preparing at least one material selected from the group consisting of low crystalline carbon and amorphous carbon with a hydrophilic material, followed by purification to prepare a mixture for coating, (b) mixing the mixture for coating with a crystalline carbon-based material to prepare a core-shell precursor in which the mixture for coating is coated on a core including a crystalline carbon-based material, and (c) calcining the core-shell precursor to carbonize the material for preparing the at least one material selected from the group consisting of low crystalline carbon and amorphous carbon into the at least one material selected from the group consisting of low crystalline carbon and amorphous carbon.

14 Claims, No Drawings

METHOD FOR PREPARING ANODE ACTIVE MATERIAL

CROSS REFERENCE TO RELATED APPLICATIONS

This application is a Continuation of PCT/KR2012/000101 filed on Jan. 5, 2012, which claims priority under 35 U.S.C 119(a) to Patent Application No. 10-2011-0002565 filed in the Republic of Korea on Jan. 11, 2011, all of which are hereby expressly incorporated by reference into the present application.

TECHNICAL FIELD

The present invention relates to a method for preparing an anode active material and more particularly to a method for preparing an anode active material comprising a core comprising a crystalline carbon-based material and a composite coating layer comprising at least one material selected from the group consisting of low crystalline carbon and amorphous carbon and a hydrophilic material through a procedure comprising mixing a precursor of a material for preparing the at least one material selected from the group consisting of low crystalline carbon and amorphous carbon with the hydrophilic material, followed by purification to prepare a mixture for coating, mixing the mixture for coating with the crystalline carbon-based material to prepare a core-shell precursor in which the mixture for coating is coated on the core comprising the crystalline carbon-based material, and calcining the core-shell precursor to carbonize the material for preparing the at least one material selected from the group consisting of low crystalline carbon and amorphous carbon into the at least one material selected from the group consisting of low crystalline carbon and amorphous carbon.

BACKGROUND ART

Technological development and increased demand for mobile devices have led to rapid increase in the demand for secondary batteries as energy sources. Among such secondary batteries, lithium secondary batteries having high energy density, high operating voltage, long cycle span and low self-discharge rate are commercially available and widely used.

In addition, increased interest in environmental issues has recently brought about a great deal of research associated with electric vehicles (EV) and hybrid electric vehicles (HEV) as alternatives to vehicles using fossil fuels such as gasoline vehicles and diesel vehicles which are main causes of air pollution. Such electric vehicles generally use nickel-metal hydride (Ni-MH) secondary batteries as power sources. However, a great deal of study associated with use of lithium secondary batteries with high energy density, discharge voltage, and output stability is currently underway and some are commercially available.

A lithium secondary battery has a structure in which a non-aqueous electrolyte containing a lithium salt is impregnated into an electrode assembly comprising a cathode and an anode, each including an active material coated on a current collector, with a porous separator interposed between the cathode and the anode.

Lithium cobalt-based oxide, lithium manganese-based oxide, lithium nickel-based oxide, lithium composite oxide and the like are generally used as cathode active materials of lithium secondary batteries. Carbon-based materials are generally used as anode active materials. Use of silicon compounds, sulfur compounds and the like as anode active materials is also under consideration.

However, lithium secondary batteries have various problems, some of which are associated with fabrication and operating properties of an anode.

First, regarding anode fabrication, a carbon-based material used as an anode active material is highly hydrophobic and thus has low miscibility with a hydrophilic solvent, thereby reducing dispersion uniformity of solid components, in the process of preparing a slurry for electrode fabrication. In addition, hydrophobicity of the anode active material complicates impregnation of highly polar electrolytes in the battery fabrication process. Thus, electrolyte impregnation is a bottleneck in the battery fabrication process, greatly decreasing productivity.

Addition of a surfactant as an additive to an anode, an electrolyte or the like has been suggested as a possible solution to the problems. However, surfactants are unsuitable due to side effects upon operating properties of batteries.

On the other hand, regarding the operating properties of an anode, the carbon-based anode active material induces an initial irreversible reaction since a solid electrolyte interface (SEI) layer is formed on the surface of the carbon-based anode active material during an initial charge/discharge (activation) cycle. Removal (breakage) and reformation of the SEI layer through repeated charge/discharge cycles also causes depletion of the electrolyte, thereby reducing battery capacity.

Various methods, such as formation of an SEI layer with much stronger bonding to the anode active material and formation of an oxide layer or the like on the surface of the anode active material, have been attempted to solve these problems. However, these methods are unsuitable for commercialization due to problems such as deterioration in electrical conductivity caused by the oxide layer and deterioration in productivity caused by additional processes.

In addition, it is difficult to form an oxide layer with different properties on a highly non-polar anode active material and thus forming a uniform oxide layer inherently increases process cost.

Thus, there is a great need for secondary batteries capable of fundamentally solving these problems.

DISCLOSURE

Technical Problem

Therefore, the present invention has been made to solve the above and other technical problems that have yet to be resolved.

As a result of a variety of extensive and intensive studies and various experiments to solve the above problems, the present inventors have developed, as described below, an anode active material with a unique structure which can simultaneously solve various problems associated with the anode fabrication process and a lot of problems associated with operating properties of batteries, i.e., an anode active material with a structure in which a specific composite coating layer is formed on a crystalline carbon-based core, and have also developed a novel method for effectively preparing such an anode active material through a simple process. The present invention has been completed based on this work.

Technical Solution

In accordance with the present invention, there is provided a method for preparing an anode active material comprising a core comprising a crystalline carbon-based material and a composite coating layer comprising at least one material selected from the group consisting of low crystalline carbon and amorphous carbon and a hydrophilic material, the method comprising (a) mixing a precursor of a material for preparing the at least one material selected from the group consisting of low crystalline carbon and amorphous carbon with the hydrophilic material, followed by purification to prepare a mixture for coating, (b) mixing the mixture for coating with the crystalline carbon-based material to prepare a core-shell precursor in which the mixture for coating is coated on the core comprising the crystalline carbon-based material, and (c) calcining the core-shell precursor to carbonize the material for preparing the at least one material selected from the group consisting of low crystalline carbon and amorphous carbon into the at least one material selected from the group consisting of low crystalline carbon and amorphous carbon.

A crystalline carbon-based material as a core component and at least one material selected from the group consisting of low crystalline carbon and amorphous carbon exhibit high hydrophobicity. Generally, a material which is to be converted into at least one material selected from the group consisting of low crystalline carbon and amorphous carbon through calcination (i.e., a material for preparing at least one material selected from the group consisting of low crystalline carbon and amorphous carbon) also exhibits hydrophobicity. Therefore, if a material for preparing at least one material selected from the group consisting of low crystalline carbon and amorphous carbon and a hydrophilic material are directly mixed with a crystalline carbon-based material, the material for preparing at least one material selected from the group consisting of low crystalline carbon and amorphous carbon and the hydrophilic material are difficult to homogenize, with the result that it is difficult to obtain a desirable core-shell precursor having a structure in which a uniform mixture of such materials is coated on a core comprising a crystalline carbon-based material. Therefore, a domain whose main component is at least one material selected from the group consisting of low crystalline carbon and amorphous carbon and a domain whose main component is a hydrophilic material are formed on a composite coating layer of an anode active material obtained through calcination, with the result that it is difficult to achieve all of the desired effects of the present invention.

On the other hand, according to the present invention, a precursor of the material for preparing at least one material selected from the group consisting of low crystalline carbon and amorphous carbon is mixed with a hydrophilic material, followed by purification to prepare a mixture for coating, and the mixture for coating is then mixed with a crystalline carbon-based material. Thus is obtained a core-shell precursor in which a uniform mixture for coating, comprising a material for preparing at least one material selected from the group consisting of low crystalline carbon and amorphous carbon and a hydrophilic material, is coated on a core comprising a crystalline carbon-based material.

When the core-shell precursor obtained in this manner is calcined, it is possible to obtain an anode active material having a unique structure in which a composite coating layer, which comprises a matrix comprising one component selected from at least one material selected from the group consisting of low crystalline carbon and amorphous carbon and a hydrophilic material and a filler comprising a remaining component selected therefrom, the filler being incorporated in the matrix, covers a core comprising a crystalline carbon-based material.

Generally, a carbon-based material is classified into graphite having a complete layered crystal structure such as natural graphite, soft carbon having a low-crystalline layered crystal structure (graphene structure in which hexagonal carbon units are arrayed in a honeycomb shaped layer form), and hard carbon having a structure in which such structures are mixed with non-crystalline parts.

In a preferred embodiment, the crystalline carbon-based material as a core component of the present invention may be graphite or a mixture of graphite and low crystalline carbon and one of the components of the composite coating layer may be low-crystalline carbon, amorphous carbon, or a mixture thereof.

A preferred example of the precursor of the material for preparing the at least one material selected from the group consisting of low crystalline carbon and amorphous carbon is a pitch solution. Generally, pitch is classified into petroleum-based pitch and coal-based pitch. Therefore, the precursor may be derived from a petroleum-based material, a coal-based material, or a mixture of petroleum and coal-based materials. For example, petroleum-based pitch is obtained by purifying a high-boiling residue remaining after crude oil is refined. Therefore, a highly uniform coating mixture can be obtained by mixing the pitch solution with a hydrophilic material, followed by purification.

Specifically, the purification process of the pitch solution includes the processes of adding some materials to the pitch solution and removing relatively low boiling impurities such as hydrocarbons and sulfur therefrom through heat treatment under an inert atmosphere at a temperature ranging from 350 to 700° C., followed by cooling and grinding. The coating mixture may be obtained through these processes.

Especially, when the hydrophilic material is added in the pitch solution step, uniform dispersion of the hydrophilic material can be advantageously maximized, as compared to when the hydrophilic material is simply mixed with pitch.

A solution in various phases may be used as the pitch solution. For example, not only a low-viscosity liquid-phase solution but also a high-viscosity and substantially solid-phase solution may be used as the pitch solution. Of course, a solution partially containing solid components may be used as the pitch solution as appropriate.

The type of the hydrophilic material as another component of the composite coating layer in the present invention is not particularly limited so long as the hydrophilic material does not have negative effects upon operating properties of batteries while exhibiting high hydrophilicity and polarity relative to the at least one material selected from the group consisting of low crystalline carbon and amorphous carbon. The hydrophilic material is preferably an oxide, a nitride, a carbide, or the like, that does not react with lithium. These materials may be used singly or as a mixture of two or more thereof.

Preferred examples of the oxide include, but are not limited to, aluminum oxide, magnesium oxide, zirconium oxide, or a mixture of two or more thereof.

Preferred examples of the nitride include, but are not limited to, silicon nitride.

Preferred examples of the carbide include, but are not limited to, silicon carbide, cobalt carbide, or a mixture thereof.

In the present invention, the structure of the composite coating layer may be determined depending on components forming the matrix and the filler.

In a first exemplary structure, a filler comprising a hydrophilic material is incorporated in a matrix comprising at least one material selected from the group consisting of low crystalline carbon and amorphous carbon.

In a second exemplary structure, a filler comprising at least one material selected from the group consisting of low crystalline carbon and amorphous carbon is incorporated in a matrix comprising a hydrophilic material.

In the composite coating layer, the content of the components of the matrix is not necessarily greater than the content of the components of the filler since the components of the matrix have continuous phases while the components of the filler have independent phases.

In the composite coating layer, the content of the at least one material selected from the group consisting of low crystalline carbon and amorphous carbon and the content of the hydrophilic material are not particularly limited so long as the intended effects of the present invention (as described above) are achieved. In a preferred embodiment, in the composite coating layer that has been subjected to carbonization in step (c), the at least one material selected from the group consisting of low crystalline carbon and amorphous carbon and the hydrophilic material may be mixed in a ratio from 1:9 to 9:1 on a weight basis. Accordingly, in the step of carbonizing the material for preparing carbon, when the carbonization yield is 50%, the material for preparing the at least one material selected from the group consisting of low crystalline carbon and amorphous carbon and the hydrophilic material may be mixed in a ratio from 2:9 to 18:1 on a weight basis in the coating mixture of step (b).

The amount of the composite coating layer (coated on the anode active material) is preferably 0.5 to 20% by weight, based on the total amount of the anode active material. When the amount of the composite coating layer is excessively low or the thickness thereof is excessively small, disadvantageously, the effects of formation of the composite coating layer may not be achieved. Conversely, when the amount of the composite coating layer is excessively high or the thickness thereof is excessively great, disadvantageously, a desired core-composite coating layer structure may not be formed, thereby causing capacity reduction.

In the present invention, the core-shell precursor is calcined in step (c) to form the composite coating layer. Preferably, calcination is performed under an inert atmosphere or an oxygen deficient atmosphere at a temperature ranging from 600 to 2000° C. Through such calcination, the material for preparing amorphous carbon is carbonized and converted into amorphous carbon while the hydrophilic material is not converted. In a preferred example, the material for preparing amorphous carbon may have a carbonization yield of about 20 to 80% and the carbonization yield may have various values according to the constitution of the material for preparing amorphous carbon.

The present invention also provides an anode active material prepared using the method described above.

The anode active material prepared using the method described above can simultaneously solve all problems associated with the related art since the anode active material has a unique structure in which a composite coating layer with a matrix/filler structure comprising at least one material selected from the group consisting of low crystalline carbon and amorphous carbon and a hydrophilic material is coated on a core comprising a crystalline carbon-based material.

First, the hydrophilic material, which is included as a matrix or filler component in the composite coating layer, exhibits a high affinity for a hydrophilic solvent in a slurry for anode fabrication, thereby improving dispersion of solid components in the slurry. Accordingly, when an anode is fabricated by applying the slurry to a current collector, distribution uniformity between components such as a binder and the anode active material can be improved and superior electrode properties can thus be achieved.

Uniformity improvement through the hydrophilic material can minimize a decrease in the bonding strength between the active material layer and a partial current collector which occurs on a non-uniform electrode. Basically, the hydrophilic material increases the affinity between the active material layer and the surface of the current collector, improving the bonding strength between the active material layer and the current collector, and thereby solves the problem of increase in internal resistance caused by separation of the active material layer from the current collector.

Similarly, the hydrophilic material included in the composite coating layer imparts hydrophilicity to at least a part of the anode active material. This greatly reduces impregnation time of the highly polar electrolyte in the electrode fabrication process, thereby considerably improving battery productivity.

Second, the hydrophilic material included in the composite coating layer previously forms a layer that provides the same function as an SEI having a strong chemical bond and forms an even stronger bond with the surface of the anode. This reduces the amount of irreversible ions required to form the SEI layer and also minimizes removal of the SEI layer during repeated charge and discharge, ultimately improving battery lifespan.

Third, the at least one material selected from the group consisting of low crystalline carbon and amorphous carbon included as a matrix or filler component in the composite coating layer minimizes the problem of deterioration in electrical conductivity which is caused by the presence of the hydrophilic material. In addition, in the case of a lithium secondary battery, growth of lithium dendrites may occur since the crystalline carbon-based material serving as a core has a potential close to that of lithium. However, this growth can be inhibited since the surface of the crystalline carbon-based material is coated with the at least one material selected from the group consisting of low crystalline carbon and amorphous carbon.

The present invention also provides an anode mix comprising the anode active material.

The anode mix according to the present invention comprises 1 to 20% by weight of a binder, and optionally comprises 0 to 20% by weight of a conductive material, based on the total weight of the anode mix.

Examples of the binder include polytetrafluoroethylene (PTFE), polyvinylidene fluoride (PVdF), cellulose, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymers (EPDM), sulfonated EPDM, styrene butadiene rubbers, fluoro-rubbers, various copolymers, and polymer-saponified polyvinyl alcohols.

Any conductive material may be used without particular limitation so long as suitable conductivity is provided without causing chemical changes in the battery. Examples of the conductive material include graphite, carbon blacks such as acetylene black, Ketjen black, channel black, furnace black, lamp black and thermal black, conductive fibers such as carbon fibers and metallic fibers, metallic powders such as carbon fluoride powder, aluminum powder and nickel powder, conductive whiskers such as zinc oxide and potassium titanate whiskers, conductive metal oxides such as titanium oxide, and polyphenylene derivatives. Specific examples of commercially available conductive materials include various acetylene black products (available from Chevron Chemical company, Denka Singapore Private Limited and Gulf Oil company), Ketjen Black EC series (available from Armak company), Vulcan XC-72 (available from Cabot company) and Super P (available from Timcal company).

Where appropriate, a filler may be added as a component to inhibit expansion of the anode. Any filler may be used without particular limitation so long as the filler is a fibrous material that does not cause chemical changes in the battery. Examples of the filler include olefin-based polymers such as polyethylene and polypropylene and fibrous materials such as glass fibers and carbon fibers.

Optionally, other components such as viscosity controllers or adhesion promoters may be further added singly or in combination of two or more thereof.

The viscosity controller is a component that controls the viscosity of the electrode mix to facilitate mixing of the electrode mix and application of the same to a current collector, and may be added in an amount of up to 30% by weight, based on the total weight of the anode mix. Examples of the viscosity controller include, but are not limited to, carboxymethyl cellulose and polyvinylidene fluoride. In some cases, the afore-mentioned solvent may also act as the viscosity controller.

The adhesion promoter is an auxiliary ingredient that is added to improve adhesion of an active material to a current collector, and is present in an amount of not more than 10% by weight, relative to the binder and examples thereof include oxalic acid, adipic acid, formic acid, and acrylic acid derivatives and itaconic acid derivatives.

The present invention also provides an anode for secondary batteries in which the anode mix is applied to a current collector.

The anode may be produced by adding an anode material containing an anode active material, a binder or the like to a solvent such as NMP to prepare a slurry and applying the slurry to an anode current collector, followed by drying and pressing.

The anode current collector is generally fabricated to a thickness of 3 to 500 µm. Any anode current collector may be used without particular limitation so long as suitable conductivity is provided without causing chemical changes in the battery. Examples of the anode current collector include copper, stainless steel, aluminum, nickel, titanium, sintered carbon, copper or stainless steel surface-treated with carbon, nickel, titanium or silver, and aluminum-cadmium alloys. The anode current collector may include fine irregularities on the surface thereof so as to enhance adhesion of anode active materials. In addition, the current collector may be used in various forms such as a film, a sheet, a foil, a net, a porous structure, a foam and a nonwoven fabric.

The present invention also provides a secondary battery, preferably a lithium secondary battery, comprising the anode.

The lithium secondary battery has a structure in which a non-aqueous electrolyte containing a lithium salt is impregnated into an electrode assembly comprising a cathode, an anode, and a separator interposed between the cathode and the anode.

For example, the cathode may be prepared by applying a cathode active material to a cathode current collector, followed by drying and pressing. Optionally, the cathode may further include other components such as a binder or a conductive material described above in association with the configuration of the anode.

The cathode current collector is generally manufactured to a thickness of 3 to 500 µm. Any cathode current collector may be used without particular limitation so long as high conductivity is provided without causing chemical changes in the battery. Examples of the cathode current collector include stainless steel, aluminum, nickel, titanium, sintered carbon, or aluminum or stainless steel surface-treated with carbon, nickel, titanium or silver. Similar to the anode current collector, the cathode current collector may include fine irregularities on the surface thereof so as to enhance adhesion to the cathode active material. In addition, the cathode current collector may be used in various forms such as a film, a sheet, a foil, a net, a porous structure, a foam and a nonwoven fabric.

The cathode active material is a lithium transition metal oxide comprising two or more transition metals as a substance that causes electrochemical reaction, and examples thereof include, but are not limited to, layered compounds such as lithium cobalt oxide ($LiCoO_2$) or lithium nickel oxide ($LiNiO_2$) substituted by one or more transition metals; lithium manganese oxide substituted by one or more transition metals; lithium nickel-based oxides represented by the formula $LiNi_{1-y}M_yO_2$ (in which M=Co, Mn, Al, Cu, Fe, Mg, B, Cr, Zn or Ga, the lithium nickel-based oxide including at least one of the elements, and $0.01 \leq y \leq 0.7$); lithium nickel cobalt manganese composite oxides represented by the formula $Li_{1+z}Ni_bMn_cCo_{1-(b+c+d)}M_dO_{(2-e)}A_e$ such as $Li_{1+z}Ni_{1/3}CO_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine-based lithium metal phosphates represented by the formula $Li_{1+x}M_{1-y}M'_yPO_{4-z}X_z$ (in which M=a transition metal, preferably, Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

The binder, the conductive material and optionally added components have been described above in association with the anode.

The separator is interposed between the cathode and the anode. A thin insulating film having high ion permeability and mechanical strength is used as the separator. The separator typically has a pore diameter of 0.01 to 10 µm and a thickness of 5 to 300 µm. For example, a sheet or nonwoven fabric made of polyethylene or glass fibers or an olefin-based polymer such as polypropylene, which is chemically resistant and hydrophobic, is used as the separator.

Where appropriate, a gel polymer electrolyte may be coated on the separator in order to improve battery stability. Representative examples of the gel polymer include polyethylene oxide, polyvinylidene fluoride and polyacrylonitrile. When a solid electrolyte such as a polymer is used as the electrolyte, the solid electrolyte may also serve as a separator.

The lithium salt-containing non-aqueous electrolyte comprises a non-aqueous electrolyte and a lithium salt.

Examples of the non-aqueous electrolyte include aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the non-aqueous electrolyte include organic solid electrolytes such as polyethylene derivatives, polyethylene oxide derivatives, polypropylene oxide derivatives, phosphoric acid ester polymers, polyagitation lysine, polyester sulfide, polyvinyl alcohol, polyvinylidene fluoride, and polymers containing ionic dissociation groups.

Examples of the non-aqueous electrolyte include inorganic solid electrolytes such as nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the non-aqueous electrolyte and may include, for example, $LiCl$, $LiBr$, $LiI$, $LiClO_4$, $LiBF_4$, $LiB_{10}Cl_{10}$, $LiBF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenylborate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS) and the like.

In a preferred embodiment, the lithium salt-containing non-aqueous electrolyte may be prepared by adding a lithium salt, such as $LiPF_6$, $LiClO_4$, $LiBF_4$ or $LiN(SO_2CF_3)_2$, to a mixed solvent of a cyclic carbonate such as EC or PC as a highly dielectric solvent and linear carbonate such as DEC, DMC or EMC as a low-viscosity solvent.

The present invention also provides a middle or large-sized battery pack that uses the secondary battery as a unit cell.

The middle or large-sized battery pack has a considerably large battery cell (unit cell) size, as compared to a small battery pack, in order to obtain high capacity and thus the electrolyte impregnation process or the like requires much more time. An anode comprising a hydrophilic material according to the present invention is highly desirable since impregnation time can be greatly reduced.

Preferred examples of the battery pack include, but are not limited to, lithium ion secondary battery packs for vehicles or power storage devices.

The structure of middle or large-sized battery packs using a secondary battery as a unit cell and a fabrication method thereof are well known in the art and a detailed explanation thereof is thus omitted in this specification.

BEST MODE

Now, the present invention will be described in more detail with reference to the following examples without limiting the scope of the present invention.

Example 1

During production of pitch having a carbonization yield of 50% as a material for low crystalline carbon, aluminum oxide ($Al_2O_3$) having a mean particle diameter of about 100 nm was added, as a material having relatively high hydrophilicity, to a precursor of the pitch, followed by purification to produce a pitch/aluminum oxide composite material. Here, the weight ratio of pitch to aluminum oxide was 8:2. The pitch/aluminum oxide composite material (A) and graphite (B) having a mean particle diameter of about 20 μm as a core material were homogenously mixed in a weight ratio of A:B of 10:90. This mixture was thermally treated under a nitrogen atmosphere at 1200° C. for 2 hours in an electric furnace. During thermal treatment, the pitch was softened and carbonized while being coated on a graphite surface in the form of a composite with aluminum oxide to produce a core-shell-structured graphite-based anode active material coated with a carbon/aluminum oxide composite.

The anode active material, SBR and CMC were mixed in a weight ratio of active material:SBR:CMC of 97.0:1.5:1.5 to prepare a slurry and the slurry was applied to a Cu-foil to prepare an electrode. The electrode was roll-pressed to impart a porosity of about 23% and punched to fabricate a coin-type half-cell. Li metal was used as a counter electrode in the cell and 1M $LiPF_6$ dissolved in a carbonate solvent was used as an electrolyte.

Example 2

An anode active material was produced and a coin-type half-cell was fabricated in the same manner as in Example 1, except that the weight ratio of pitch to aluminum oxide ($Al_2O_3$) was 8:1 and the pitch/aluminum oxide composite material and the graphite were mixed in a weight ratio of 9:91.

Example 3

An anode active material was produced and a coin-type half-cell was fabricated in the same manner as in Example 1, except that magnesium oxide (MgO) having a mean particle diameter of about 100 nm was used instead of aluminum oxide ($Al_2O_3$).

Comparative Example 1

An anode active material was produced and a coin-type half-cell was fabricated in the same manner as in Example 1, except that aluminum oxide was not added during pitch production and thus only pitch was used as a coating material.

Comparative Example 2

An anode active material was produced and a coin-type half-cell was fabricated in the same manner as in Example 1, except that the weight ratio of pitch to aluminum oxide was 1:9.

Since the carbonization yield of the pitch is 50%, the content of the aluminum oxide is greater than 90% based on the total amount of the carbon and aluminum oxide.

Comparative Example 3

During pitch production, the aluminum oxide was not added and the graphite, pitch, and aluminum oxide were simultaneously mixed in a weight ratio of 90:8:2. This mixture was thermally treated under a nitrogen atmosphere in an electric furnace in the same manner as in Example 1 to produce an anode active material and then a coin-type half-cell was fabricated therefrom.

Experimental Example 1

Electrolyte impregnation properties were evaluated using electrodes fabricated in accordance with Examples 1 to 3 and Comparative Examples 1 to 3. The electrode was roll-pressed to impart a porosity of about 23% and the time required for 1 microliter (µl) of an electrolyte of 1M LiPF$_6$ dissolved in a carbonate solvent to completely permeate into the surface of the electrode after being dropped on the surface was measured. Results are shown in Table 1 below.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| Impregnation time (sec) | 88 | 90 | 86 | 142 | 95 | 92 |

As can be seen from Table 1, the electrodes using an anode active material coated with a carbon/hydrophilic material composite as in Examples 1 to 3 of the present invention exhibited considerably short electrolyte impregnation times, as compared to an electrode using an anode active material coated with only carbon as in Comparative Example 1. The reason for this is that the anode active material surface was coated with a hydrophilic material, enabling the highly polar electrolyte to rapidly permeate between particles.

Experimental Example 2

Charge/discharge properties were evaluated using the coin-type half-cells fabricated in accordance with Examples 1 to 3 and Comparative Examples 1 to 3. Specifically, during charge, the cells were charged in a CC mode at a current density of 0.1 C to 5 mV and were then maintained in a CV mode at 5 mV and charging was completed when current density reached 0.01 C. During discharge, the cells were discharged in a CC mode at a current density of 0.1 C to 1.5V. As a result, the charge/discharge capacity and efficiency of a first cycle were obtained. Then, charge/discharge was repeated 50 times under the same conditions as above, except that the current density was changed to 0.5 C. Results are shown in Table 2 below.

TABLE 2

|  | Ex. 1 | Ex. 2 | Ex. 3 | Comp. Ex. 1 | Comp. Ex. 2 | Comp. Ex. 3 |
|---|---|---|---|---|---|---|
| Charge capacity (mAh/g) | 382.5 | 383.9 | 383.1 | 385.1 | 357.9 | 382.6 |
| Discharge capacity (mAh/g) | 354.1 | 355.1 | 354.1 | 356.6 | 325.3 | 353.5 |
| Efficiency (%) | 92.6 | 92.5 | 92.6 | 92.6 | 90.9 | 92.4 |
| Capacity maintenance (%) after 50 charge/discharge cycles | 92 | 90 | 90 | 78 | 62 | 86 |

As can be seen from Table 2, anode active materials coated with a carbon/hydrophilic material composite as in Examples 1 to 3 of the present invention exhibited very high capacity maintenance after 50 charge/discharge cycles, as compared to an anode active material coated only with carbon as in Comparative Example 1. The reason for this is that a hydrophilic material serving the same function as SEI formed a strong bond with a core material via carbon to inhibit removal of the SEI layer during repeated charge/discharge cycles and also that a material having high charge/discharge voltage was coated to prevent precipitation of lithium and improve ionic conductivity.

In addition, it can be seen that anode active materials containing a very high content of a hydrophilic material that did not react with lithium as in Comparative Example 2 exhibited very low discharge capacity and the surfaces thereof exhibited high electrical resistance, thus reducing capacity maintenance after 50 charge/discharge cycles.

It can also be seen that, when a simple mixture of graphite and a hydrophilic material was used rather than adding the hydrophilic material during the pitch preparation process as in Comparative Example 3, the hydrophilic material was not homogeneously distributed, instead forming clusters. Thus, the fabricated electrode was non-uniform, thereby decreasing the capacity maintenance ratio after 50 charge/discharge cycles, as compared to the examples.

INDUSTRIAL APPLICABILITY

As is apparent from the above description, advantageously, the method according to the present invention can effectively produce an anode active material with a unique structure in that a composite coating layer comprising at least one material selected from the group consisting of low crystalline carbon and amorphous carbon and a hydrophilic material is formed on the outer surface of a core comprising a crystalline carbon-based material with high uniformity.

It will be apparent to those skilled in the art that various applications and modifications can be made based on the above description without departing from the scope of the invention.

The invention claimed is:

1. A method for preparing an anode active material comprising a core comprising a crystalline carbon-based material and a composite coating layer comprising at least one material selected from the group consisting of low crystalline carbon and amorphous carbon and an aluminum oxide, a magnesium oxide, a zirconium oxide, or mixtures thereof, the method comprising:
    (a) mixing a precursor of a material for preparing the at least one material selected from the group consisting of low crystalline carbon and amorphous carbon with the hydrophilic material, followed by purification to prepare a mixture for coating, wherein the precursor for the raw material of the one or more materials selected from the group consisting of low crystalline carbon and amorphous carbon is a pitch solution and the pitch solution is mixed with an aluminum oxide, a magnesium oxide, a zirconium oxide, or mixtures thereof, prior to purification of the pitch solution;
    (b) homogenously mixing the mixture for coating with the crystalline carbon-based material to prepare a core-shell precursor in which the mixture for coating is coated on the core comprising the crystalline carbon-based material; and
    (c) calcining the core-shell precursor to carbonize the material for preparing the at least one material selected from the group consisting of low crystalline carbon and amorphous carbon into amorphous carbon,
    wherein after mixing of the pitch solution with the aluminum oxide, the magnesium oxide, the zirconium oxide, or mixtures thereof, the mixture is subjected to purification, wherein purification comprises removing impurities by thermal treatment, followed by cooling and grinding,
    wherein the impurities comprise hydrocarbons and sulfur having a relatively low boiling point, and
    wherein said thermal treatment is conducted under an inert atmosphere at a temperature of 350° C. to 700° C.

2. The method according to claim 1, wherein the composite coating layer has a structure in which a filler is incorporated in a matrix comprising one component selected from the at least one material selected from the group consisting of low crystalline carbon and amorphous carbon and the hydrophilic material, the filler comprising a remaining component selected therefrom.

3. The method according to claim 1, wherein the crystalline carbon-based material comprises at least one of graphite and low crystalline carbon.

4. The method according to claim 1, wherein the precursor of the material for preparing the at least one material selected from the group consisting of low crystalline carbon and amorphous carbon is a pitch solution.

5. The method according to claim 1, wherein the precursor is derived from a coal-based material, or a petroleum-based material, or a mixture of petroleum and coal-based materials.

6. The method according to claim 1, wherein the hydrophilic material comprises at least one selected from the group consisting of an oxide, a nitride, and a carbide that exhibit high hydrophilicity relative to the at least one material selected from the group consisting of low crystalline carbon and amorphous carbon and that do not react with lithium.

7. The method according to claim 6, wherein the oxide comprises at least one selected from the group consisting of aluminum oxide, magnesium oxide, and zirconium oxide.

8. The method according to claim 6, wherein the nitride is silicon nitride.

9. The method according to claim 6, wherein the carbide comprises at least one selected from the group consisting of silicon carbide and cobalt carbide.

10. The method according to claim 1, wherein the calcination is performed under an inert atmosphere or an oxygen deficient atmosphere at a temperature ranging from 600 to 2000° C.

11. The method according to claim 1, wherein the composite coating layer has a structure in which a filler comprising the hydrophilic material is incorporated in a matrix comprising the at least one material selected from the group consisting of low crystalline carbon and amorphous carbon.

12. The method according to claim 1, wherein the composite coating layer has a structure in which a filler comprising the at least one material selected from the group consisting of low crystalline carbon and amorphous carbon is incorporated in a matrix comprising the hydrophilic material.

13. The method according to claim 1, wherein, in the composite coating layer that has been subjected to carbonization in the step (c), the at least one material selected from the group consisting of low crystalline carbon and amorphous carbon and the hydrophilic material are mixed in a ratio from 1:9 to 9:1 on a weight basis.

14. The method according to claim 1, wherein the amount of the composite coating layer is 0.5 to 20% by weight, based on the total weight of the anode active material.

* * * * *